(12) United States Patent
Pitsch (10) Patent No.: US 8,510,168 B2
(45) Date of Patent: Aug. 13, 2013

(54) CLIENT RELATIONSHIP MANAGEMENT AND PRODUCT DISTRIBUTION SYSTEM AND METHOD

(75) Inventor: Karl-Heinz Pitsch, Woodland Hills, CA (US)

(73) Assignee: Wella GmbH, Darmstadt (DE)

( * ) Notice: Subject to any disclaimer, the term of this patent is extended or adjusted under 35 U.S.C. 154(b) by 1938 days.

(21) Appl. No.: 10/647,980

(22) Filed: Aug. 26, 2003

(65) Prior Publication Data

US 2004/0103035 A1     May 27, 2004

Related U.S. Application Data

(60) Provisional application No. 60/406,371, filed on Aug. 26, 2002.

(51) Int. Cl.
G06Q 20/00     (2012.01)
G06Q 10/00     (2012.01)

(52) U.S. Cl.
USPC .............................................. 705/16; 705/28

(58) Field of Classification Search
None
See application file for complete search history.

(56) References Cited

U.S. PATENT DOCUMENTS

| | | | | |
|---|---|---|---|---|
| 4,767,917 A | * | 8/1988 | Ushikubo | 235/381 |
| 5,163,010 A | * | 11/1992 | Klein et al. | 700/239 |
| 5,960,411 A | * | 9/1999 | Hartman et al. | 705/26 |
| 6,601,040 B1 | * | 7/2003 | Kolls | 705/14.23 |
| 6,883,561 B2 | * | 4/2005 | Bartholomew et al. | 141/18 |
| 7,099,740 B2 | * | 8/2006 | Bartholomew et al. | 700/231 |

* cited by examiner

Primary Examiner — Paul Danneman
(74) Attorney, Agent, or Firm — Fulbright & Jaworski LLP (57) ABSTRACT

A method of distributing hair care or cosmetic products where a salon owner, stylist or booth renter can procure hair care or cosmetic products including hair dyes from a vending device located within the salon as needed at the point of use. The transaction data representing the product purchased, identification of the purchaser, location of the vending device and like is transmitted to a central computer over a communications network. The central computer updates inventory data of the vending device based on the transaction data and if necessary, schedules delivery to the vending device based on the updated inventory data. Additionally, apart from inventory control, the transaction data can be used to follow fashion trends in the hair care and cosmetics fields.

48 Claims, 7 Drawing Sheets

CLIENT RELATIONSHIP MANAGEMENT AND PRODUCT DISTRIBUTION SYSTEM AND METHOD

RELATED APPLICATION

This application is a continuation of U.S. provisional patent application Ser. No. 60/406,371 filed on Aug. 26, 2002, which is incorporated by reference in its entirety herein.

BACKGROUND OF THE INVENTION

The present invention relates to the field of product distribution system, namely distributing hair care and cosmetic products to hair and beauty care professionals.

Typically, hair and beauty care professionals must stock various hair care and cosmetic products to service their customers. The inventory of the various hair care and cosmetic products must be sufficient to last a predetermined period of time, such as a day, week, month, etc. Accordingly, there is a risk that either some of inventory will never get used, become outdated or stale or that a certain product will be out of stock causing a lost sale. Thus, the hair care or cosmetic professional bears all the risk in managing the inventory of hair care and cosmetic products. Therefore, it is desirable to provide a product distribution method, which shifts the burden of managing the inventory of hair and beauty care products to the manufacturer or distributor.

Currently, hair care and cosmetic manufacturers fill finished hair care and cosmetic products into small disposable aluminum tubes and plastic containers at the manufacturing site. The hair care and cosmetic manufacturer then distributes the finished hair care and cosmetic products in disposable containers to individual retail outlets and salons via a direct sales force, wholesale dealer or distributors. Generally, no change in the product can occur after the finished hair care and cosmetic product leaves the hair care and cosmetic manufacturer. For instance, the number of colors/shades offered for a particular hair care or cosmetic product can be significantly large, e.g., Koleston Perfect® permanent hair creme color is available in over 130 shades. Thus, the salon owner or stylist could stock over 130 different shades to carry a complete line of Koleston Perfect® permanent hair creme color. Accordingly, current inventory management is inefficient in terms of space utilization and greatly maximizes the risk that some of inventory will never get used, become outdated or go stale. Therefore, it is highly desirable to provide a vending system and method which enables the professional hair or beauty care stylist to procure customized hair care or cosmetic products as needed on demand at the point-of-use. This enables the salon owner, cosmetic professional or stylist to offer a complete line of hair care and/or cosmetic products without incurring the inventory costs and space issues associated with stocking the entire line of hair care or cosmetic products.

In certain sectors of the hair and beauty care business, a hair care or cosmetic professional rents a booth, chair or space from a salon owner. These hair care professionals are called booth renters. For example, the hairdressers typically procure their hair care products, such as hair dyes, from the direct sales force or beauty supply store. Accordingly, the hairdressers typically must know their customer's hair care requirements on appointment, and must overstock in advance to properly procure the necessary hair care products for walk-in customers and to accommodate last minute changes, such as dying hair blonde instead of red. Additionally, booth renters may work at odd hours where they cannot get deliveries. Therefore, it is desirable to provide a product distribution method, which permits the cosmetic professionals to procure the requisite cosmetic products as needed on demand at the point-of-use, i.e., at the hair salon servicing a customer.

SUMMARY AND OBJECTS OF THE INVENTION

Therefore, it is an object of the present invention to provide a product distribution system and method which solves the above-noted problems.

It is also an object of the present invention to provide a method of distributing hair care or cosmetic products on demand at the point-of-use, including the steps of installing a vending device and logical system which electronically transmits inventory data to a central database thus ensuring efficient restocking according to fashion trends in a salon; purchasing one or more hair care or cosmetic products from the vending device by a professional hair or beauty care booth renters which generates transaction data; transmitting the transaction data to a central computer over a communications network; updating inventory data of the vending device based on the transaction data; and scheduling restocking to the vending device based on the updated inventory data according to fashion trends.

It is another object of the present invention to provide a method of managing client relationships and distributing hair care and cosmetic products on demand at the point-of-use, including the steps of installing a vending device in a salon; accessing the vending device by an booth renter to purchase one or more hair care or cosmetic products; authenticating the booth renter to determine if the booth renter is authorized to access the vending device; and dispensing one or more hair care and cosmetic products to the booth renter if it is determined that the booth renter is authorized to access the vending device.

It is still another object of the present invention to provide a method of distributing a customized hair care or cosmetic products having a plurality of shades at a point-of-use to a booth renter, including the steps of selecting a shade of the hair care or cosmetic product by the professional user; determining an amount of each base stock color required to prepare the shade selected by said professional user; dispensing determined amount of the respective base stock color into a tray to provide the selected shade of hair care or cosmetic product; and delivering the tray, preferably disposable, containing the prepared hair care or cosmetic product at the point-of-use to the professional user.

It is a further object of the present invention to provide a vending apparatus for distributing a customized hair care or cosmetic product having a plurality of shades at a point-of-use to a professional user, comprising a user interface for selecting a shade of the hair care or cosmetic product by the professional user; a processor for determining an amount of each base stock color required to prepare the shade selected by said professional user; a plurality of reservoirs, each containing different base stock color of the hair care or cosmetic product, for dispensing determined amount of the respective base stock color into a tray to provide the selected shade of the hair care or cosmetic product; and a dispensing device for delivering said tray containing the prepared hair care or cosmetic product at the point-of-use to the professional user.

It is also an object of the present invention to provide a method of distributing hair color products on demand at the point-of-use, including the steps of installing a vending device and logical system which electronically transmits inventory data to a central database thus ensuring efficient restocking according to fashion trends in a salon; purchasing one or more hair color products from the vending device by a professional user which generates transaction data; transmitting the transaction data to a central computer over a communications network; updating inventory data of the vending device based on the transaction data; and scheduling restocking to the vending device based on the updated inventory data according to fashion trends. Hair color products are especially suited for the present invention because changing fashion trends would require professional users and booth renters to store many shades of color with the associated risk of inventory going stale. Additionally, in many locations hair color products are regulated such that only licensed cosmologists can purchase and use such products. Embodiments of the above invention can include an interface allowing only properly licensed users to purchase hair color products such as by requiring a pin number or other access restrictive system.

Various other objects of the present invention will become readily apparent from the ensuing detailed description of the drawings.

BRIEF DESCRIPTION OF THE DRAWINGS

The following detailed description, given by way of example, and not intended to limit the present invention solely thereto, will be best understood in conjunction with the accompany drawings.

DESCRIPTION OF THE EMBODIMENTS

In accordance with an embodiment of the present invention, the product distribution method, provides a vending device in conjunction with a logistics system to enable the professional hair or beauty care provider to procure the hair care or cosmetic products on demand at the point-of-use. That is, for example, a vending device can be located in a hair salon to permit the hair stylist or hairdresser to procure the requisite hair care product as needed on demand. The vending device can include a mechanical interface comprising a currency acceptance mechanism (coin slot and/or bill slot), a series of push buttons, a product dispenser, and a coin return. Preferably, the vending device includes a device for accepting credit/debit card or smart card. Generally, the credit/debit card device communicates with a remote credit verification facility to process the credit/debit card transaction.

Figure 1:
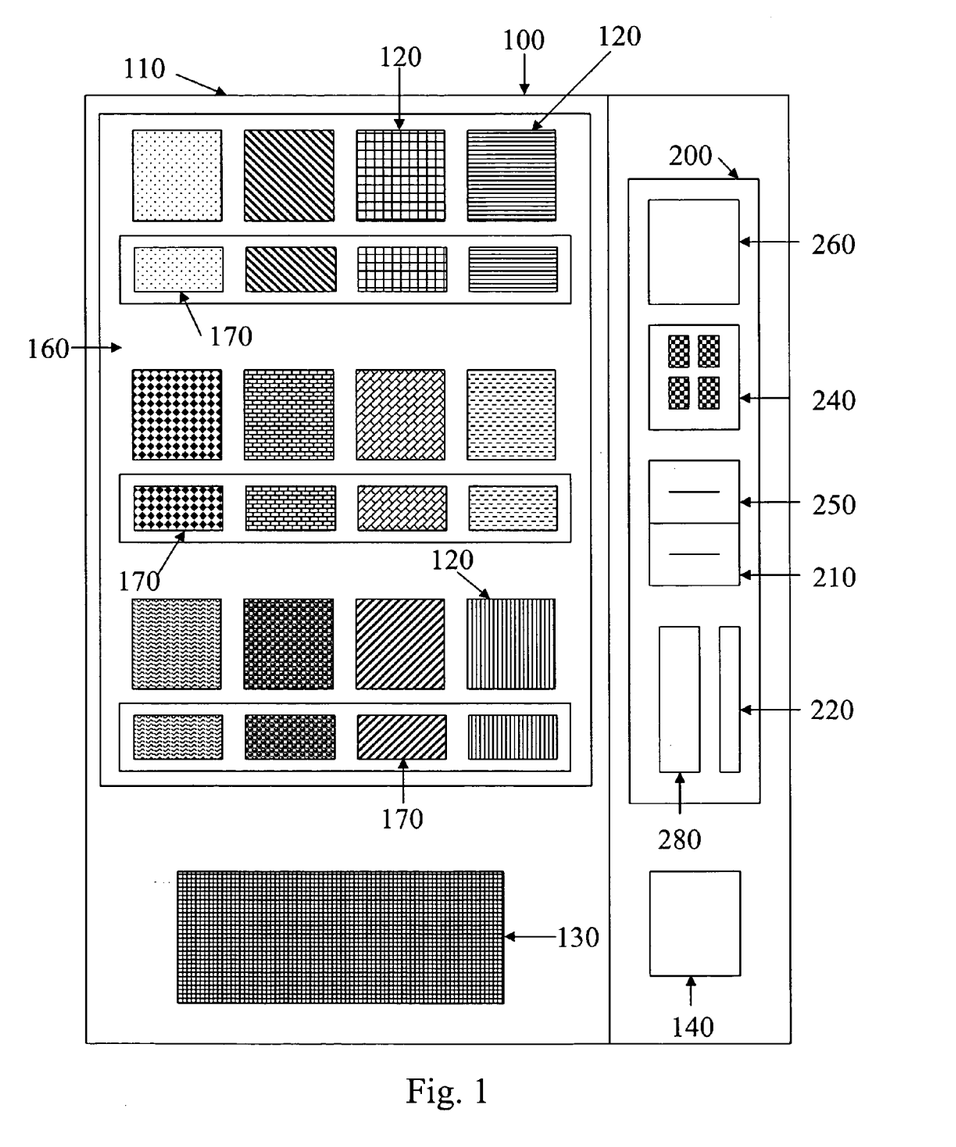
FIG. 1 shows an example of a vending device that can be adapted for use in the product distribution method and system in accordance with an embodiment of the present invention.

Turning now to FIG. 1, there is illustrated an example of a vending device that can be adapted for use in the product distribution system and method in accordance with an embodiment of the present invention. A vending device 100 comprises a housing 110 with a control panel 200 and a clear panel 160 that allows a salon owner or stylist to see the products 120 for sale and labels 170 indicating the price of the corresponding product. It is appreciated that for hair dye products, the labels 170 can additionally include color swatches for the corresponding hair dye products. The control panel 200 comprises a bill slot 210, a coin slot 220, and a product selector 240. The vending device 200 may include coin return 230 for providing change to operator of the vending device 200, such as the salon owner or stylist. It is appreciated that the bill slot 210, the coin slot 220 and the coin return 230 are well known in the art, and any known bill and coin payment mechanism can be used with the present invention.

Figure 3:
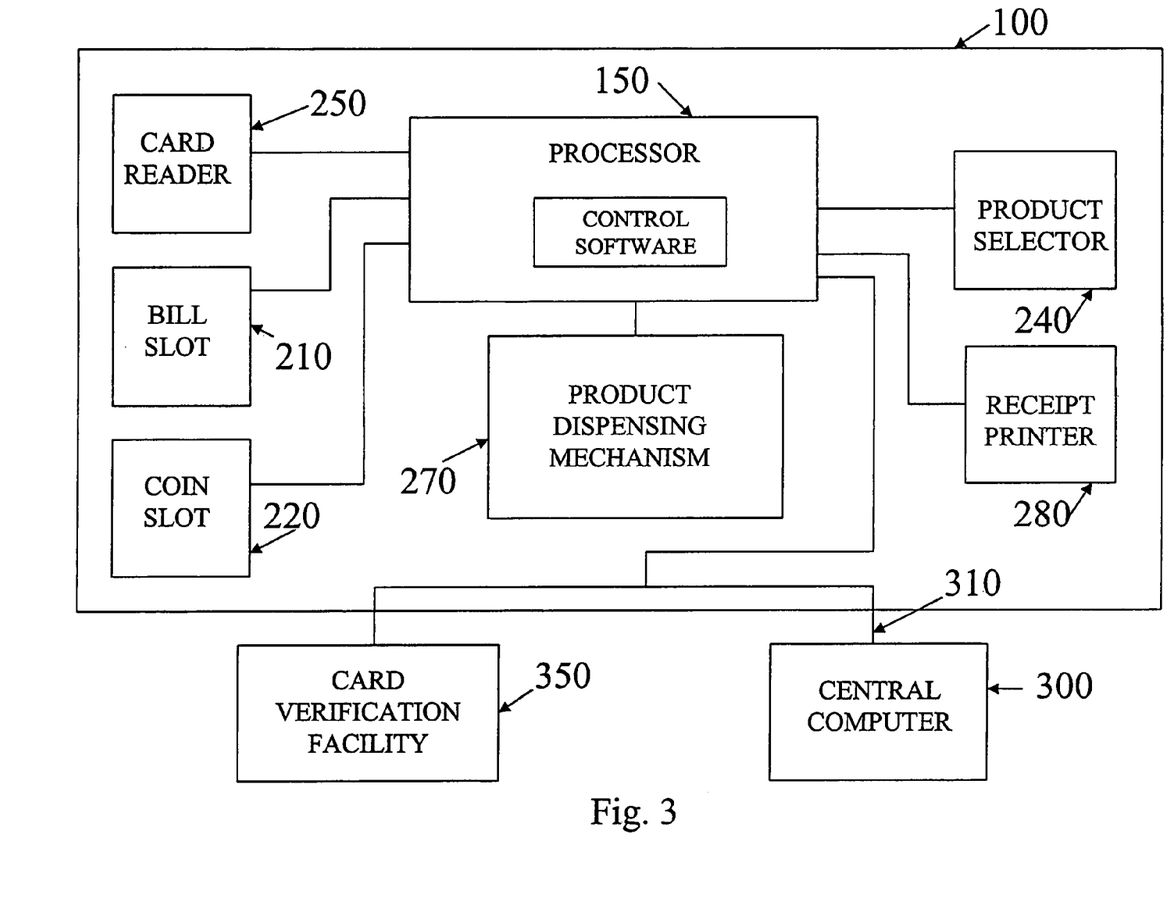
FIG. 3 is a block diagram of components of the vending device of FIG. 1.
Figure 4:
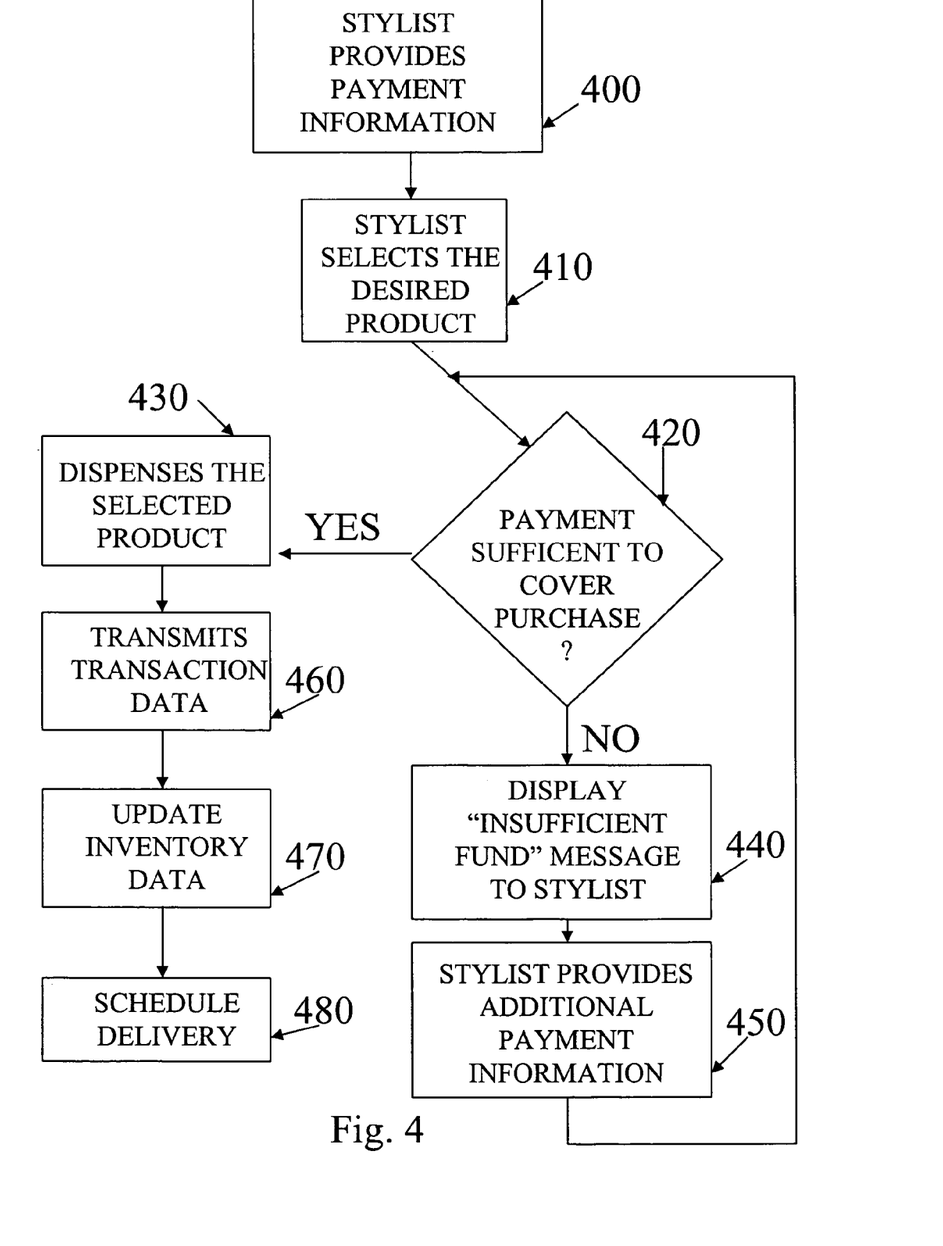
FIG. 4 is a flow chart of the product distribution method in accordance with an embodiment of the present invention.

The operation of the product distribution system is described in conjunction with FIGS. 3 and 4. A control circuitry or processor 150 (along with any software) of the vending device 100 receives the salon owner's or stylist's payment information via the bill slot 210 and/or coin slot 220 in step 400, and salon owner's or stylist's product selections from the product selector 240 in step 410. For example, for hair dye products, a color swatch can be placed next to each product to identify the color/shade of the hair dye product, thereby enabling the stylist to quickly identify and select the desired product from the vending device 100. The processor 150 determines if sufficient amount of money has been provided to cover the cost of purchase in step 420. If the processor 150 determines that the salon owner or stylist has provided sufficient amount to cover the cost of the purchase, the processor 150 of the vending device 100 causes a product dispensing mechanism 270 to dispense or deliver the selected product to a dispensing bin 130 in step 430. It is appreciated that if the processor 150 determines that the salon owner or stylist has provided payment in excess of the cost of the purchase, then the processor 150 can instruct the coin return 230 to provide the overage to the salon owner or stylist. The salon owner or stylist then removes the vended hair care or cosmetic product 120 from the dispensing bin 130 for use in servicing his/her customer. Otherwise, the processor 150 displays a message, such as "insufficient fund" or other comparable message to the salon owner or stylist on a display device 260 in step 440. The processor 150 waits for additional payment information from the salon owner or stylist via the bill slot 210 or coin slot 220 in step 450 and returns to step 420.

Figure 2:
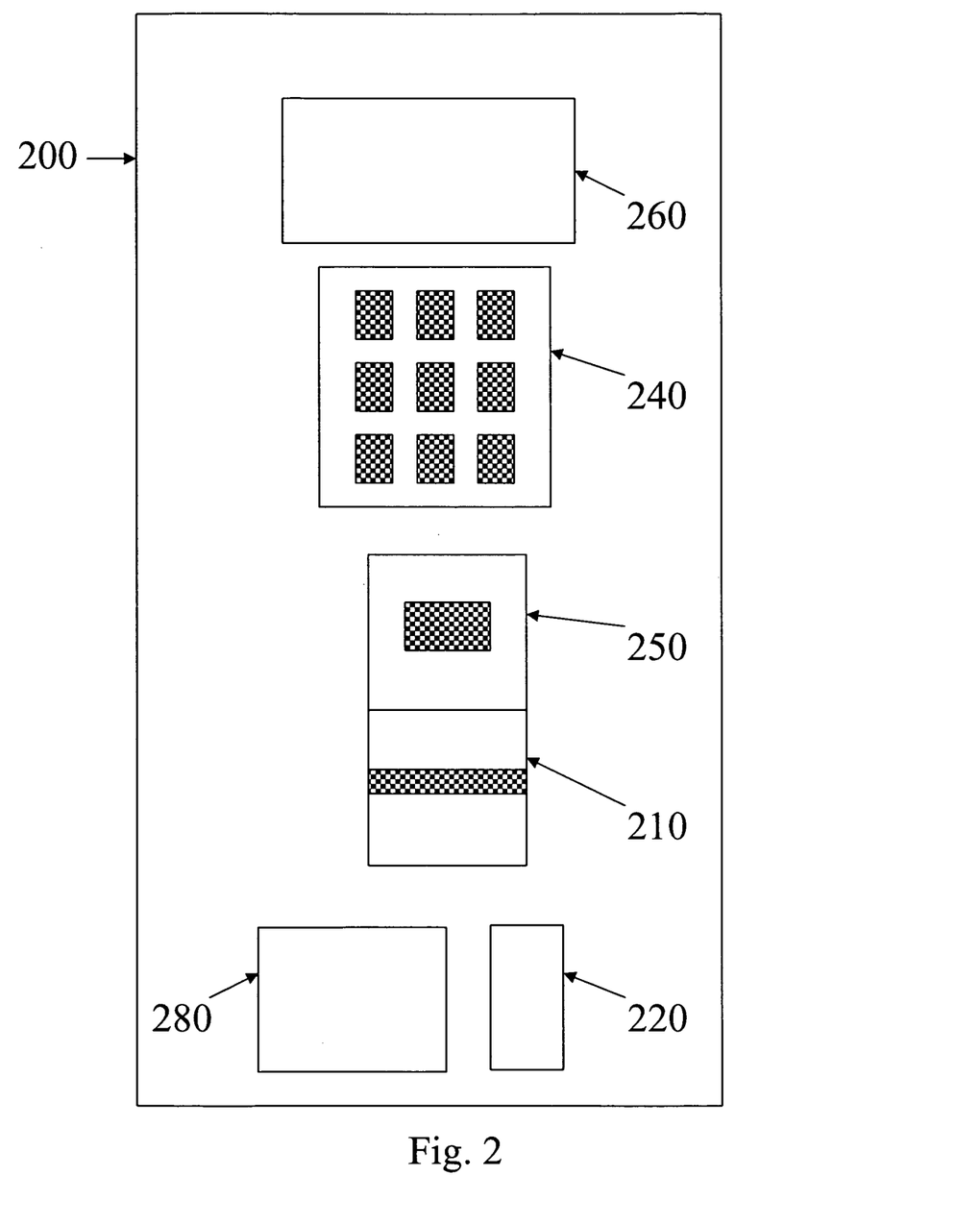
FIG. 2 is a block diagram of a control panel of the vending device of FIG. 1.

Turning now to FIGS. 2 and 3, the control panel 200 may additionally include a card reader 250 and a receipt printer 280 for printing a receipt of the credit or debit card transaction. The display device 260 for displaying text or a combination of text and graphics is preferably a liquid crystal display (LCD). The product selector 240 can be a series of buttons, a keypad and the like. Preferably, the product selector 240 is a keypad for entering data, such as a pin number for purchasing the product using a debit card. In accordance with an embodiment of the present invention, the keypad can be integrated into a touch-responsive display device 260. The display device 260 is used to prompt the operator, i.e., salon owner or stylist, for input, such as the desired hair product selection, which can be entered via the keypad 240. The data obtained from the keypad 240 as well as the card reader is transmitted to a remote card verification facility 350 for credit card verification. Alternatively, the data can be transmitted to a central computer 300 for credit card verification and/or updating the inventory data.

To purchase a product from the vending device 100, depending on the type of the card reader, the salon owner or stylist can either swipe or insert his/her credit or debit card into the card reader 250. It is appreciated that the card reader 250 can also read a smart card or a pre-paid card. In accordance with an embodiment of the present invention, the processor is operable to verify and initiate the fund collection from the credit and debit card companies, such as American Express, Visa, MasterCard, etc. Alternatively, the vending device 100 transmits the credit or debit card information to a central computer 300 over a communications network 310, such as the Internet, LAN, WAN, wireless network, etc., for verifying and initiating fund collection from the credit and debit card companies. The processor 150 or the central computer 300 can inform the purchaser, i.e., the salon owner or stylist, of the status of credit or debit card verification by displaying such status information on the display device 260.

After the hair care product is dispensed to the salon owner or stylist, the vending device 100 transmits the transaction data, such as product sku number, location of the vending device, etc., to the central computer 300 over the communications network 310 in step 460. Upon receipt of the transaction data, the central computer 300 updates the inventory data of the vending device 100 in step 470 and if necessary, delivery to the vending device (i.e., the associated hair or beauty salon) is automatically scheduled for restocking in step 480. It is appreciated that the transaction data additionally provides immediate feedback as to the market acceptance of a particular hair care or cosmetic product and/or market acceptance of a particular shade within the hair care or cosmetic product line. Also, the manufacturer and/or distributor can determine customer trends based on the transaction data, generating sales report based on transactions data, such as demographics (location, age, etc.) and the like.

Figure 5:
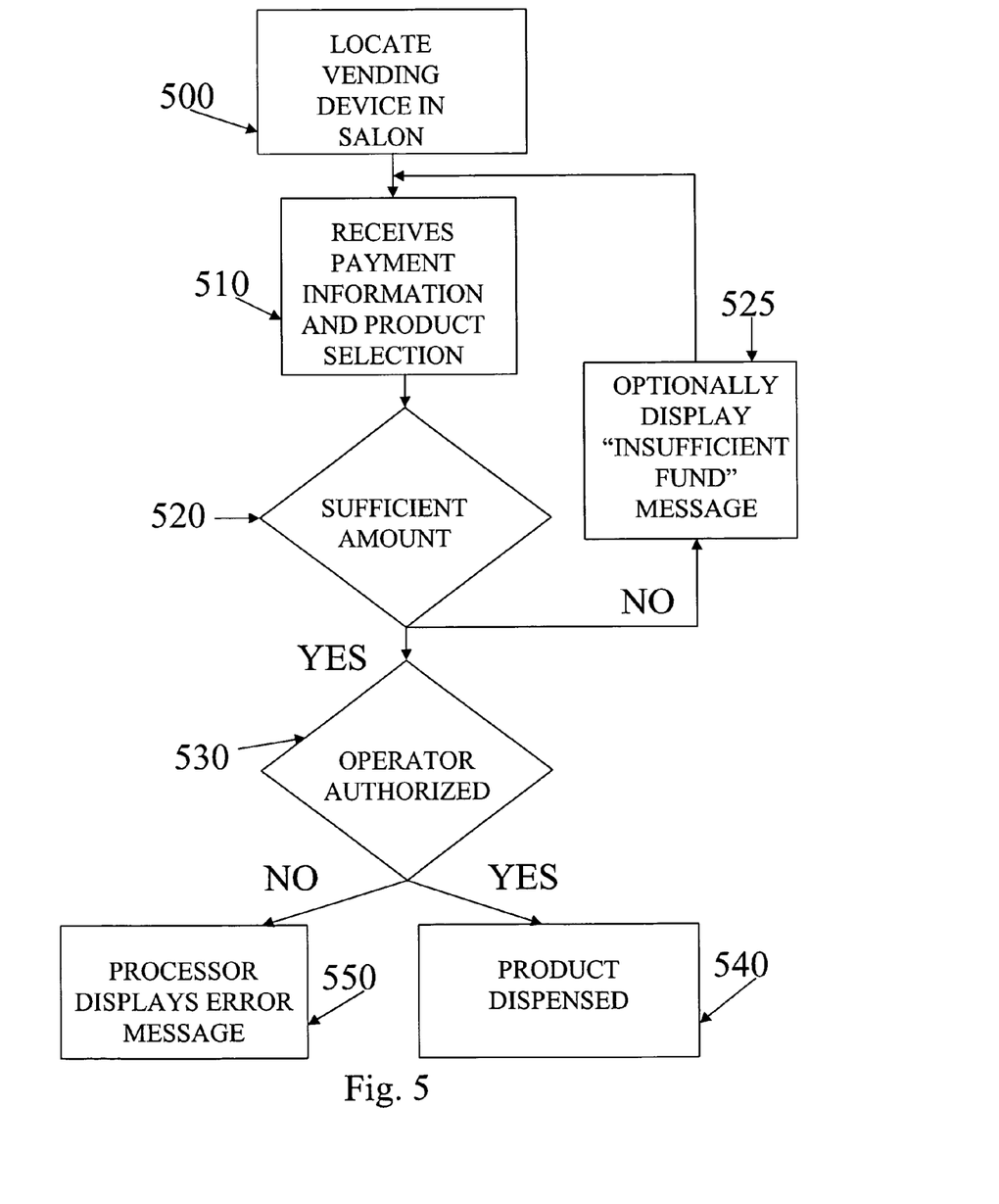
FIG. 5 is a flow chart of the client management and product distribution method in accordance with an embodiment of the present invention.

Turning now to FIG. 5, in accordance with an embodiment of the present invention, the product distribution system and method insures that professional line of hair care and cosmetic products are sold to only hair and beauty care professionals, such as beauty and/or hair salon owners, stylists, hairdressers and the like. That is, hair care and cosmetic manufacturers may have certain agreements with their distributor that restrict them from selling certain hair care and cosmetic product lines directly to the consumers. Thus, in order to comply with such business agreement, the manufacturers must take steps to insure that their hair care and cosmetic products are sold only to hair and beauty care professionals. That is, the present product distribution system and method provides a security mechanism to insure that the hair care and cosmetic products in the vending device 100 is sold only to hair and beauty care professionals. Accordingly, the present product distribution system and method locates the vending devices in hair and beauty salons, preferably away from salon customers, for use by hair and beauty care professionals in servicing their customers in step 500. The operator can attempt to access the vending device 100 by providing payment information, such as by either inserting appropriate currency bills and/or coins into the bill slot 210 and/or coin slot 220 or inserting a credit or debit card into the card reader 250, and entering the desired product selection on the product selector 240 in step 510. The processor 150 determines if sufficient amount of money has been provided to cover the cost of purchase in step 520. If the processor 150 determines that the operator has not provided sufficient amount to cover the cost of purchase, the processor 150 optionally displays a message, such as "insufficient fund" or other comparable message, to the operator on the display device 260 in step 525 and returns to step 526 for additional payment information from the operator via the bill slot 210, coin slot 220 or card reader 250 in step 526.

However, if processor 150 determines that the operator has provided sufficient amount to cover the cost of the purchase, then the processor 150 authenticates or verifies if the operator is an authorized user (i.e., salon owner, stylist, etc.) of the vending device 100 in step 530. That is, the processor 150 can request the operator to provide a valid personal identification number ("pin")/password or insert a valid identification card into the card reader 250 in step 530. It is appreciated that any known method of verifying whether an operator is authorized can be used. If the processor 150 determines that the operator is an authorized user, then the processor 150 causes the product dispensing mechanism 270 to deliver or dispense the selected product to the dispensing bin 130 in step 540. It is appreciated that if the processor 150 determines that the salon owner or stylist has provided payment in excess of the cost of the purchase, then the processor 150 can instruct the coin return 230 to provide the overage to the salon owner or stylist. The salon owner or stylist then removes the vended hair care or cosmetic product 120 from the dispensing bin 130 for use in servicing his/her customer. However, if the processor 150 determines that the operator is not authorized user, then the processor 150 displays an error message, such as "invalid pin number", on the display device 260 in step 550.

Alternatively, the operator can be required to provide a valid pin number or password, or insert a valid identification card to access the vending device 100. That is, the product selector 240 can be disabled until a valid pin number/password or identification is provided.

In accordance with an embodiment of the present invention, the vending system displays one or more product correlating with the professional hair or beauty care provider's task at hand. That is, for example, the hairdresser enters various information, such as customer's hair type, current hair color, age, desired hair color, etc., via the interactive keypad 240 and the vending system generates and displays a list of appropriate products that the hairdresser can purchase to achieve the desired result with customer's hair on the display device 260. Also, the hairdresser can provide customer's current hair situation and the desired outcome or look using the interactive keypad 240 of the vending system, e.g., the customer is currently a straight hair brunette and desires to have a thick blond permed hair. The vending system then displays a list of appropriate products to achieve desired result on the display device 260 or provides a hard copy of the list via the receipt printer 280. Alternatively, the vending system can interactively provide a series of questions to the hair dresser and select one or more appropriate product based on the hairdresser's answers to the series of questions.

In accordance with an embodiment of the present invention, the inventive vending system and method prepares and dispenses customized hair care or cosmetic products at the point-of-sale or point-of-use based on the professional user's selection (e.g., hair or beauty care professional). For example, hair care professionals have little, if any, storage space in which to store all the necessary hair dye products which come in numerous different colors and shades. Additionally, walk-in customers and customers wanting to change their usual hair care treatment make it difficult to plan for a set inventory of hair care products. The vending system and method of the present invention enables the hair care professional to stock limited number of base colors from which every available hair colors/shades can be prepared.

Figure 6:
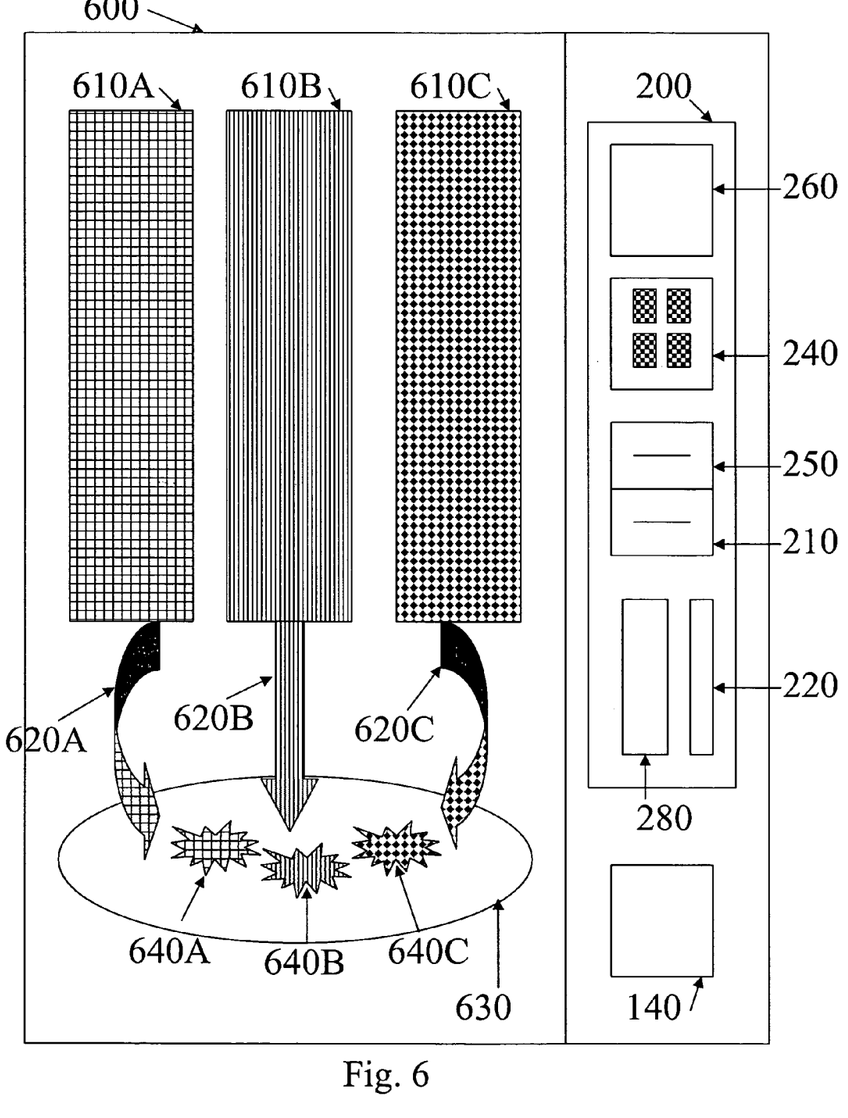
FIG. 6 is a block diagram of a vending apparatus in accordance with an embodiment of the present invention.

Turning now to FIG. 6, in accordance with an embodiment of the present invention, the vending device 600 includes a plurality of reservoirs 610A-C, each holding a base stock color dye (such as red, yellow and blue dyes). Although only three reservoirs 610A-C are shown in FIG. 6 for simplicity, the present invention contemplates any number of reservoirs. The hairdresser or hair stylist selects the desired hair color dye and the vending device 100 prepares the desired hair color dye from a pre-specified combination of one or more base stock color dye associated with the hairdresser's selection. The vending device then dispenses the prepared hair dye in a tray or container 630 for use by the hairdresser. Preferably, the tray or container is disposable and made of sturdy material, such as plastic. The hairdresser can manually mix the dispensed hair dye consisting of a predetermined combination of base stock colors to obtain the desired color or the vending device can automatically mix prepared hair dye to obtain the desired color before dispensing it to the hair dresser. That is, the vending device 600 can additionally include a mixing device for mixing the dispensed dye consisting of a predetermined combination base stock colors into the desired hair color dye. To prevent color contamination, each base stock color reservoir 610 includes a separate nozzle or funnel 620 for providing the requisite amount of the base stock color dye into the tray or container.

Figure 7:
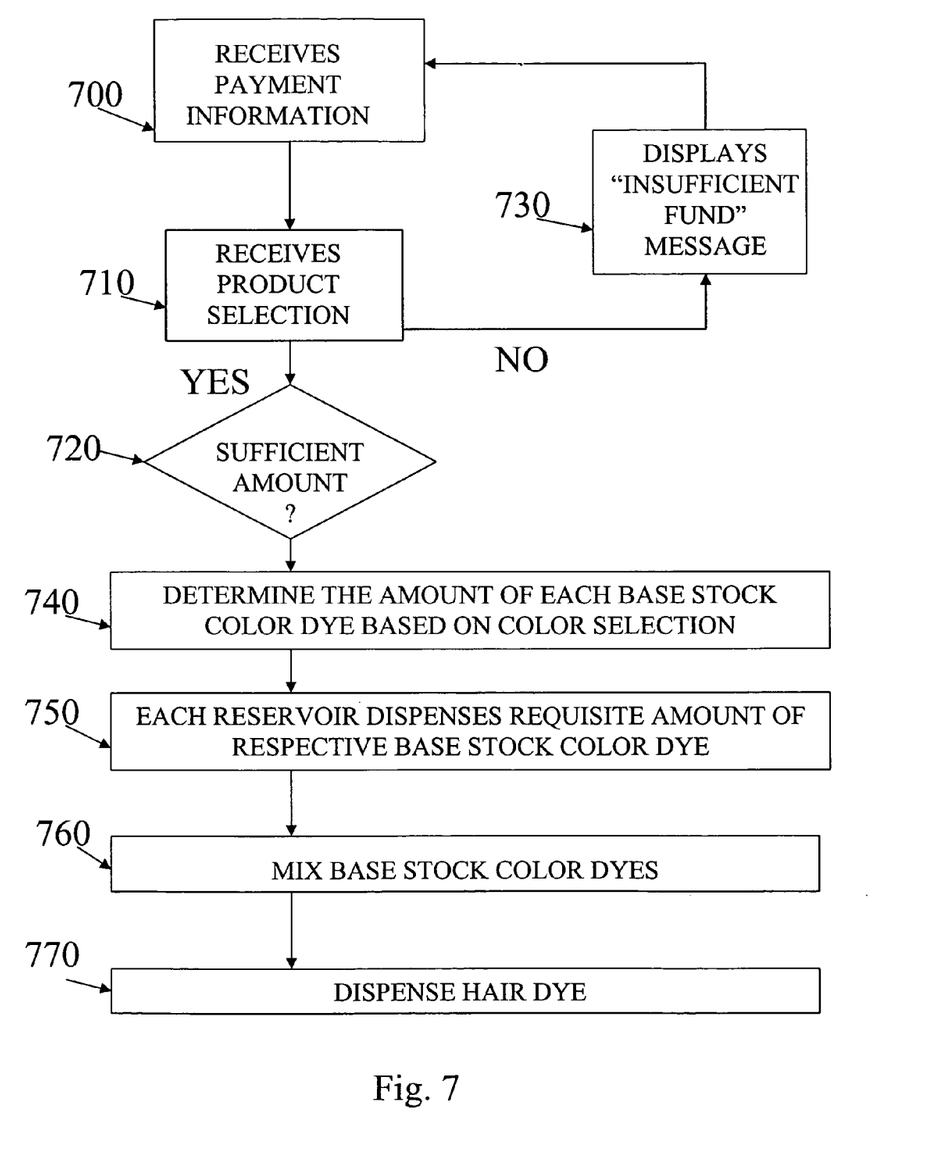
FIG. 7 is a flow chart of a method of distributing a customized hair care or cosmetic product in accordance with an embodiment of the present invention.

The operation of the vending device 600 is now described in conjunction with a flowchart in FIG. 7. The hairdresser provides payment information by either inserting appropriate currency bills and/or coins into the bill slot 210 and/or coin slot 220, or inserting a credit or debit card into the card reader 250 in step 700. The hairdresser then enters the product sku number or other comparable product identification number into the keypad or product selector 240 to purchase the desired hair dye product in step 710. It is appreciated that the hairdresser can obtain the product sku number from the product color chart.

In accordance with an aspect of the present invention, the hair dresser can view various color swatches of the product on the display device 260 and can select the appropriate color swatch to purchase the desired hair color dye using the keypad or product selector 240 in step 710. That is, the display device 260 displays the color swatches matching the available colors/shades of hair dyes from a particular line of hair dye product, such as Kolsten Perfect® permanent hair creme color, to the hairdresser who can scroll through various color swatches to select the desired color using the keypad 240.

The processor 150 determines if sufficient amount of money has been provided to cover the cost of purchase in step 720. If the processor 150 determines that the operator has not provided sufficient amount to cover the cost of purchase, the processor 150 displays a message, such as "insufficient fund" or other comparable message, to the hairdresser on the display device 260 in step 730 and returns to step 710 for additional payment information.

However, if the processor 150 determines that the hairdresser has provided sufficient amount to cover the cost of the purchase, then the processor 150 determines the amount of each base stock color dye 640A-C required to prepare the particular hair color dye selected by the hairdresser in step 740 and causes each base stock color reservoir 610 to dispense the requisite or determined amount of the respective base stock color dye 640A-C into the tray 630 via the respective nozzle 620 in step 750. To prevent potential color contamination, each base stock color reservoir includes a separate nozzle or funnel 620 for providing the requisite amount of the base stock color dye into the tray or container. It is appreciated that the processor 150 can access a table stored in memory (not shown) based on the hairdresser's selection to determine the amount of each base stock color dye 640A-C required to prepare the requested hair dye.

The vending device 600 then dispenses the requested hair dye 640 in the tray 630 for use by the hairdresser in step 770. Preferably, the tray 630 is disposable and made of sturdy material, such as plastic. The hairdresser can manually mix the dispensed hair dye 640 consisting of a predetermined combination of base stock colors 640A-C to obtain the desired color or the vending device 600 can automatically mix prepared hair dye to obtain the desired color before dispensing it to the hairdresser 760. That is, the vending device 600 can additionally include a mixing device (not shown) for mixing the dispensed dye 640 consisting of a predetermined combination base stock colors 640A-C into the desired hair color dye.

While the present invention has been particularly described with respect to the illustrated embodiment, it will be appreciated that various alterations, modifications and adaptations may be made on the present disclosure, and are intended to be within the scope of the present invention. It is intended that the appended claims be interpreted as including the embodiment discussed above, those various alternatives, which have been described, and all equivalents thereto.

What is claimed:

1. A method of remotely managing inventories of a plurality of vending devices over a communications network, comprising the steps of:
    authenticating an operator of a vending device of said plurality of vending devices to determine if said operator is licensed to purchase hair care or cosmetic products;
    generating transaction data when a purchase is made on said vending device, said transaction data comprising identification information of said vending device and one or more hair care or cosmetic products purchased by said operator from said vending device;
    receiving said transaction data from each of said plurality of vending devices by a central computer over said communications network;
    remotely managing inventory of each of said plurality of vending devices by said central computer which maintains and updates inventory data for said each of said plurality of vending devices based on said transaction data received from said each of said plurality of vending devices over said communications network when a purchase is made on said each of said plurality of vending devices; and
    scheduling delivery to replace vended hair care or cosmetic products to said each of said plurality of vending devices by said central computer, according to fashion trends, based on said updated inventory data maintained at said central computer for said each of said plurality of vending devices and thereby reduce risk of stale inventory at each of said plurality of vending devices.

2. The method of claim 1, further comprising the steps of:
    permitting said operator to purchase one or more hair care or cosmetic products from said vending device if it is determined that said operator is a professional hair or beauty care provider licensed to purchase said one or more hair care or cosmetic products; and
    dispensing said one or more hair care or cosmetic products by said vending device.

3. The method of claim 1, further comprising the step of receiving payment information from said operator.

4. The method of claim 3, further comprising the step of verifying said payment information is sufficient to cover a cost of said one or more hair care or cosmetic products by said vending device.

5. The method of claim 4, further comprising the step of dispensing said one or more hair care or cosmetic products from said vending device if it is determined that said payment information is sufficient to cover the cost of said one or more hair care or cosmetic products.

6. The method of claim 4, further comprising the step of displaying an insufficient fund message on said vending device if it is determined that said payment information is insufficient to cover the cost of said one or more hair care or cosmetic products.

7. The method of claim 4, further comprising the step of inhibiting said one or more hair care or cosmetic products from being dispensed from said vending device if it is determined that said payment information is insufficient to cover the cost of said one or more hair care or cosmetic products.

8. The method of claim 3, further comprising the step of printing a receipt for said one or more hair care or cosmetic products purchased by said operator from said vending device.

9. A method of remotely managing inventories of a plurality of vending devices over a communications network, comprising the steps of:
   authenticating an operator of an accessed vending device of said plurality of vending devices to determine if said operator is licensed to purchase one or more hair care or cosmetic products
   receiving a selection of said one or more hair care or cosmetic products from said operator by said accessed vending device;
   receiving payment information from said operator by said accessed vending device;
   verifying, by said accessed vending device, said payment information is sufficient to cover a cost of said one or more hair care or cosmetic products selected by said operator;
   dispensing said one or more hair care or cosmetic products by said accessed vending device if it is determined that said received payment information is sufficient to cover the cost of said selection of said one or more hair care or cosmetic products;
   generating transaction data, said transaction data comprising identification information of said accessed vending device and said one or more hair care or cosmetic products purchased by said operator from said accessed vending device;
   receiving said transaction data from each of said plurality of vending devices by a central computer over said communications network;
   remotely managing inventory of each of said plurality of vending devices by said central computer which maintains and updates inventory data for said each of said plurality of vending devices based on said transaction data received from said each of said plurality of vending devices over said communications network when a purchase is made on said each of said plurality of vending devices; and
   scheduling delivery to replace vended hair care or cosmetic products to said each of said plurality of vending devices by said central computer, according to fashion trends, based on said updated inventory data maintained at said central computer for said each of said plurality of vending devices and thereby reduce risk of stale inventory at each of said plurality of vending devices.

10. The method of claim 9, further comprising the step of inhibiting said one or more hair care or cosmetic products from being dispensed from said accessed vending device if it is determined that said operator is not licensed to purchase said one or more hair care or cosmetic products.

11. The method of claim 9, further comprising the steps of displaying an insufficient fund message on said accessed vending device if it is determined that said payment information is insufficient to cover the cost of said one or more hair care or cosmetic products.

12. The method of claim 9, further comprising the step of inhibiting said one or more hair care or cosmetic products from being dispensed from said accessed vending device if it is determined that said payment information is insufficient to cover the cost of said one or more hair care or cosmetic products.

13. The method of claim 9, further comprising the step of printing a receipt for said one or more hair care or cosmetic products purchased by said operator from said accessed vending device if it is determined that said operator is authorized to access said vending device.

14. A method of remotely managing inventories of a plurality of vending devices over a communications network, comprising the steps of:
   receiving a selection of a shade from a plurality of shades associated with a hair care or cosmetic product from an operator by an accessed vending device of said plurality of vending devices;
   determining by said accessed vending device a pre-specified amount of each base stock color required to prepare said shade selected by said operator;
   delivering a tray containing said shade of said prepared hair care or cosmetic product at the point-of-use to said operator by said accessed vending device;
   generating transaction data by said accessed vending device, said transaction data comprising identification information of said accessed vending device and said shade of said prepared hair care or cosmetic product purchased by said operator from said accessed vending device;
   receiving said transaction data from each of said plurality of vending devices by a central computer over said communications network; and
   remotely managing inventory of each of said plurality of vending devices by said central computer which maintains and updates inventory data for said each of said plurality of vending devices based on said transaction data received from said each of said plurality of vending devices over said communications network when a purchase of said shade is made on said each of said plurality of vending devices; and
   scheduling delivery to replace depleted base stock colors to said each of said plurality of vending devices by said central computer based on said updated inventory data maintained at said central computer, according to fashion trends, for said each of said plurality of vending devices and thereby reduce risk of stale inventory at each of said plurality of vending devices.

15. The method of claim 14, further comprising the step of authenticating said operator to determine if said operator is a professional user authorized to access said accessed vending device.

16. The method of claim 14, further comprising the steps of mixing said prepared hair care or cosmetic product by said accessed vending device prior to delivering said tray containing said prepared hair care or cosmetic product to said operator.

17. The method of claim 14, further comprising the step of receiving payment information from said operator by said accessed vending device.

18. The method of claim 17, further comprising the step of verifying said payment information is sufficient to cover a cost of said selection of said shade of said hair care or cosmetic product by said accessed vending device.

19. The method of claim 18, further comprising the step of inhibiting said tray containing said shade of said prepared hair care or cosmetic product from being dispensed from said accessed vending device if it is determined said payment information is insufficient to cover the cost of said selection of said shade of said prepared hair care or cosmetic product.

20. The method of claim 18, further comprising the steps of displaying an insufficient fund message on said accessed vending device if it is determined that said payment information is insufficient to cover the cost of said selection of said shade of said hair care or cosmetic product.

21. The method of claim 14, wherein the step of receiving a selection of said shade comprises the step of receiving a product sku number from said professional user by said accessed vending device.

22. The method of claim 14, wherein the step of receiving a selection of said shade comprises the step of displaying a set of said plurality of shades at a time on a display device of said accessed vending device to said professional user.

23. The method of claim 14, further comprising the step of printing a receipt for said prepared hair care or cosmetic product from said accessed vending device.

24. A system for remotely managing inventories of a plurality of vending devices over a communications network, comprising:
    a central computer in communications with said plurality of vending devices over said communications network; and
    each vending device comprising:
        an user interface to authenticate an operator of a vending device to determine if said operator is licensed to purchase one or more hair care or cosmetic products and to permit said operator to select and purchase said one or more hair care or cosmetic products from said each vending device;
        a processor to generate transaction data comprising identification information of said each vending device and said one or more hair care cosmetic products purchased by said operator from said each vending device; and
        a transmitting device to transmit transaction data generated by said processor to said central computer over said communications network; and
    wherein said central computer remotely manages inventory of each of said plurality of vending devices by updating inventory data maintained at said central computer for said each of said plurality of vending devices based on said transaction data received from said each of said plurality of vending devices over said communications network when a purchase is made on said each of said plurality of vending devices; and
    wherein said central computer schedules delivery to replaced vended hair care or cosmetic products to said each of said plurality of vending devices based on said updated inventory data maintained at said central computer, according to fashion trends, for said each of said plurality of vending devices and thereby reduce risk of stale inventory at each of said plurality of vending devices.

25. The system of claim 24, wherein said each vending device further comprises a dispensing device to dispense said one or more hair care or cosmetic products from said each vending device.

26. The system of claim 24, wherein said each vending device further comprises a payment device to receive payment information from said operator.

27. The system of claim 26, wherein said processor verifies whether said payment information is sufficient to cover a cost of said one or more hair care or cosmetic products.

28. The system of claim 27, wherein said each vending device further comprises a dispensing device to dispense said one or more hair care or cosmetic products from said each vending device if said processor determines that said payment information is sufficient to cover the cost of said one or more hair care or cosmetic products.

29. The system of claim 27, wherein said each vending device further comprises a display device to display an insufficient fund message on said each vending device if said processor determines that said payment information is insufficient to cover the cost of said one or more hair care or cosmetic products.

30. The system of claim 24, wherein said user interface comprises a keypad; wherein said keypad permits said operator to select and purchase said one or more hair care or cosmetic products from said each vending device if said processor determines that said operator is licensed to purchase said one or more hair care or cosmetic products.

31. The system of claim 24, wherein said each vending device further comprises a printer to print a receipt for said one or more hair care or cosmetic products purchased by said operator from said each vending device.

32. The system of claim 24, wherein said one or more hair or cosmetic products are hair dye products.

33. A system for remotely managing inventories of a plurality of vending devices over a communications network, comprising:
    a central computer in communications with said plurality of vending devices over said communications network; and
    each vending device comprising:
        a user interface to authenticate an operator of a vending device to determine if said operator is licensed to purchase one or more hair care or cosmetic products and to receive a selection of said one or more hair care or cosmetic products from said operator;
        a payment device to receive payment information from said operator;
        a processor to verify said payment information is sufficient to cover a cost of said one or more hair care or cosmetic products selected by said operator;
        a dispensing device to dispense said one or more hair care or cosmetic products from said each vending device if said processor determines said received payment information is sufficient to cover the cost of said selection of said one or more hair care or cosmetic products; and
        a transmitting device to transmit transaction data generated by said processor to said central computer over said communications network, said transaction data comprising identification information of said each vending device and said one or more hair care or cosmetic products purchased by said operator from said each vending device; and
    wherein said central computer remotely manages inventory of each of said plurality of vending devices by updating inventory data maintained at said central computer for said each of said plurality of vending devices based on said transaction data received from said each of said plurality of vending devices over said communications network when a purchase is made on said each of said plurality of vending devices; and
    wherein said central computer schedules delivery to replace vended hair care or cosmetic products to said each of said plurality of vending devices based on said updated inventory data maintained at said central computer, according to fashion trends, for said each of said plurality of vending devices and thereby reduce risk of stale inventory at each of said plurality of vending devices.

34. The system of claim 33, wherein said processor inhibits said dispensing device from dispensing said one or more hair care or cosmetic products from said each vending device if said processor determines said operator is not-licensed to purchase said one or more hair care or cosmetic products.

35. The system of claim 33, wherein said each vending device further comprises a display device to display an insufficient fund message on said each vending device if said processor determines that said payment information is insufficient to cover the cost of said one or more hair care or cosmetic products.

36. The system of claim 33, wherein said user interface comprises a keypad.

37. The system of claim 33, wherein said each vending device further comprises a printer to print a receipt for said one or more hair care or cosmetic products purchased by said operator from said each vending device.

38. The system of claim 33, wherein said one or more hair care or cosmetic products are hair dye products.

39. A system for remotely managing inventories of a plurality of vending devices over a communications network, comprising:
a central computer in communications with said plurality of vending devices over said communications network; and
each vending device comprising:
a user interface to receive a selection of a shade from a plurality of shades associated with a hair care or cosmetic product from an operator;
a payment device to receive payment information from said operator;
a processor to determine a pre-specified amount of each base stock color required to prepare said shade selected by said operator, and to generate a transaction data when said payment information is received by said payment device for said hair care or cosmetic product, said transaction data comprising identification information of said each vending device, said shade of said hair care or cosmetic product purchased by said operator;
a plurality of reservoirs, each containing different base stock color of said hair care or cosmetic product, to dispense said determined pre-specified amount of the respective base stock color into a tray to provide said shade of said hair care or cosmetic product;
a dispensing device for delivering said tray containing said prepared hair care or cosmetic product at the point-of-use to said operator; and
a transmitting device for transmitting said transaction data to said central computer over said communications network; and
wherein said central computer remotely manages inventory of each of said plurality of vending devices by updating inventory data maintained at said central computer for said each of said plurality of vending devices based on said transaction data received from said each of said plurality of vending devices when a purchase of said shade is made on said each of said plurality of vending devices; and
wherein said central computer schedules delivery to replace depleted base stock colors to said each of said plurality of vending devices based on said updated inventory data maintained at said central computer, according to fashion trends, for said each of said plurality of vending devices and thereby reduce risk of stale inventory at each of said plurality of vending devices,
wherein said each vending device further comprises a mixing device to mix said prepared hair care or cosmetic product prior to delivering said tray containing said prepared hair care or cosmetic product to said operator by said dispensing device.

40. The system of claim 39, wherein said processor authenticates said operator to determine if said operator is a professional user authorized to access said each vending device.

41. The system of claim 39, wherein said each vending device further comprises a payment device to receive payment information from said operator.

42. The system of claim 39, wherein said processor verifies said payment information is sufficient to cover a cost of said selection of said shade of said hair care or cosmetic product.

43. The system of claim 42, wherein said processor inhibits delivery of said tray containing said shade of said prepared hair care or cosmetic product by said dispensing device if it is determined said payment information is insufficient to cover the cost of said selection of said shade of said prepared hair care or cosmetic product.

44. The system of claim 42, wherein said each vending device further comprises a display device to display an insufficient fund message if it is determined that said payment information is insufficient to cover the cost of said selection of said shade of said hair care or cosmetic product.

45. The system of claim 39, wherein said user interface comprises a keypad to receive a product sku number corresponding to said shade from said operator.

46. The system of claim 39, wherein said each vending device further comprises a display device to display a set of said plurality of shades at a time; and wherein said user interface comprises a keypad to receive said selection of said shade selected from said set of said plurality of shades displayed on said display device by said operator.

47. The system of claim 39, wherein said each vending device further comprises a printer to print a receipt for said prepared hair care or cosmetic product purchased by said operator.

48. The system of claim 39, wherein said prepared hair care or cosmetic product is a hair dye product.

* * * * *